(12) United States Patent
Hishinuma

(10) Patent No.: US 11,577,474 B2
(45) Date of Patent: Feb. 14, 2023

(54) HEAT SEALER PROVIDED WITH INTERFACIAL TEMPERATURE SENSOR

(71) Applicant: Kazuo Hishinuma, Kanagawa (JP)

(72) Inventor: Kazuo Hishinuma, Kanagawa (JP)

( * ) Notice: Subject to any disclaimer, the term of this patent is extended or adjusted under 35 U.S.C. 154(b) by 0 days.

(21) Appl. No.: 16/823,355

(22) Filed: Mar. 19, 2020

(65) Prior Publication Data

US 2021/0008814 A1  Jan. 14, 2021

(30) Foreign Application Priority Data

Jul. 10, 2019  (JP) .............................. JP2019-128661

(51) Int. Cl.
*B29C 65/00* (2006.01)
*B29C 65/30* (2006.01)
*B29L 31/00* (2006.01)

(52) U.S. Cl.
CPC ........ *B29C 66/91231* (2013.01); *B29C 65/30* (2013.01); *B29C 66/40* (2013.01); *B29C 66/849* (2013.01); *B29C 66/8511* (2013.01); *B29C 66/91421* (2013.01); *B29L 2031/7128* (2013.01)

(58) Field of Classification Search
CPC ....... B29C 65/18; B29C 65/20; B29C 65/242; B29C 65/30; B29C 65/38; B29C 66/0044; B29C 66/45; B29C 66/91221; B29C 66/91411
See application file for complete search history.

(56) References Cited

U.S. PATENT DOCUMENTS

| | | | | |
|---|---|---|---|---|
| 3,506,715 A | * | 4/1970 | Clark | B01J 19/0006 568/72 |
| 6,197,136 B1 | * | 3/2001 | Hishinuma | B29C 66/91221 156/228 |
| 2006/0157472 A1 | * | 7/2006 | Mashima | H05B 3/68 219/444.1 |
| 2007/0170158 A1 | * | 7/2007 | Greig | B23K 26/244 219/121.64 |

(Continued)

FOREIGN PATENT DOCUMENTS

| | | |
|---|---|---|
| EP | 3168032 A1 | 5/2017 |
| JP | 3056172 U | 11/1998 |
| JP | 2000-94523 A | 4/2000 |

(Continued)

OTHER PUBLICATIONS

Extended European Search Report in EP Application No. 20820314. 1, dated Feb. 23, 2022, 9pp.
Written Opinion in PCT/JP2020/026320, dated Aug. 25, 2020, 4pp.

*Primary Examiner* — Christopher T Schatz
(74) *Attorney, Agent, or Firm* — Hauptman Ham, LLP

(57) ABSTRACT

The embodiment provides a heat-sealing apparatus and a method of accurately controlling heat sealing temperature by measuring the temperature using a heat-sealing apparatus which heat-seals a pair of heat seal materials by nipping them between a pair of heating bodies. The method of heat-sealing includes mounting a cover material on the surface of at least one of the heating bodies to be in contact with the heat seal material, attaching a minute temperature sensor to the surface of the cover material on the side to be in contact with the heat seal material, and controlling temperature of welding face by the temperature detected by the minute temperature sensor, and an apparatus therefor.

6 Claims, 13 Drawing Sheets

(56) References Cited

U.S. PATENT DOCUMENTS

2014/0318680 A1* 10/2014 Wada .................. B32B 37/10
                                                      156/60
2020/0108566 A1    4/2020 Hishinuma

FOREIGN PATENT DOCUMENTS

| JP | 20031708 A | 1/2003 |
| JP | 2007-313782 A | 12/2007 |
| JP | 2011167950 A | 9/2011 |
| JP | 2015120334 A | 7/2015 |
| JP | 201676019 A | 5/2016 |
| WO | 2018225290 A1 | 12/2018 |

* cited by examiner

[Fig. 1]
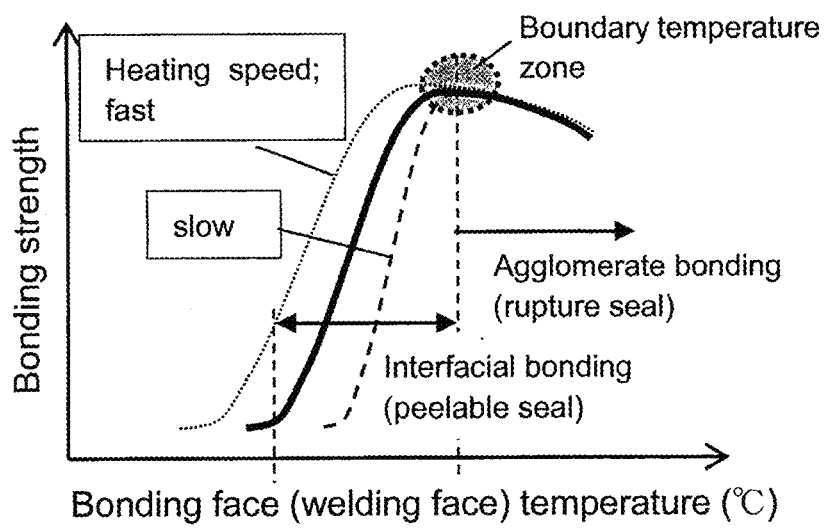
[Fig. 2]
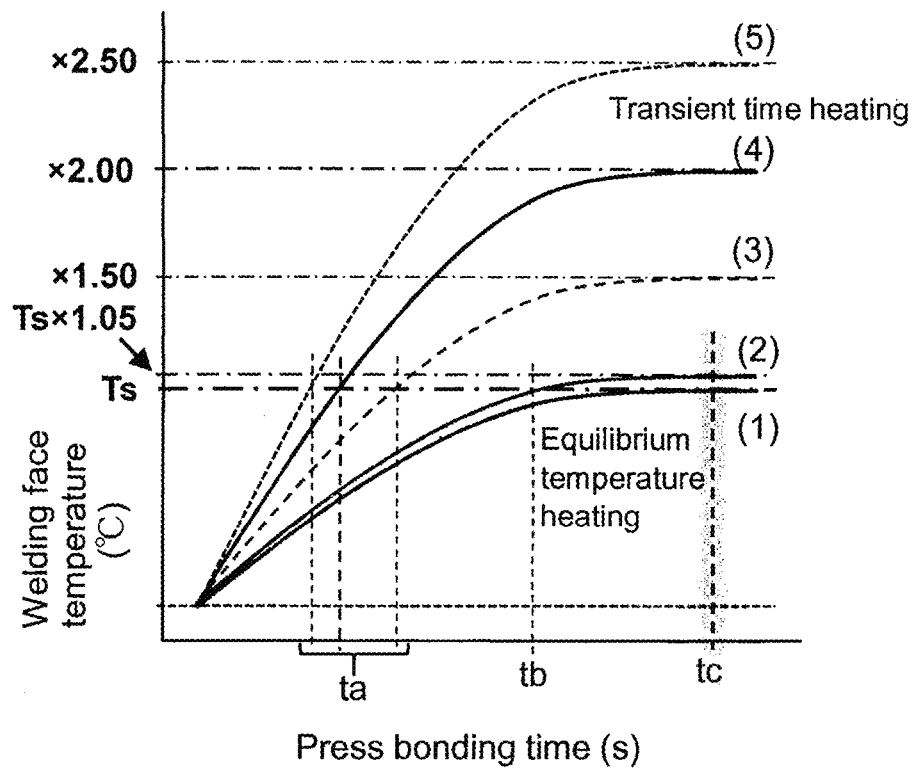

[Fig. 3]
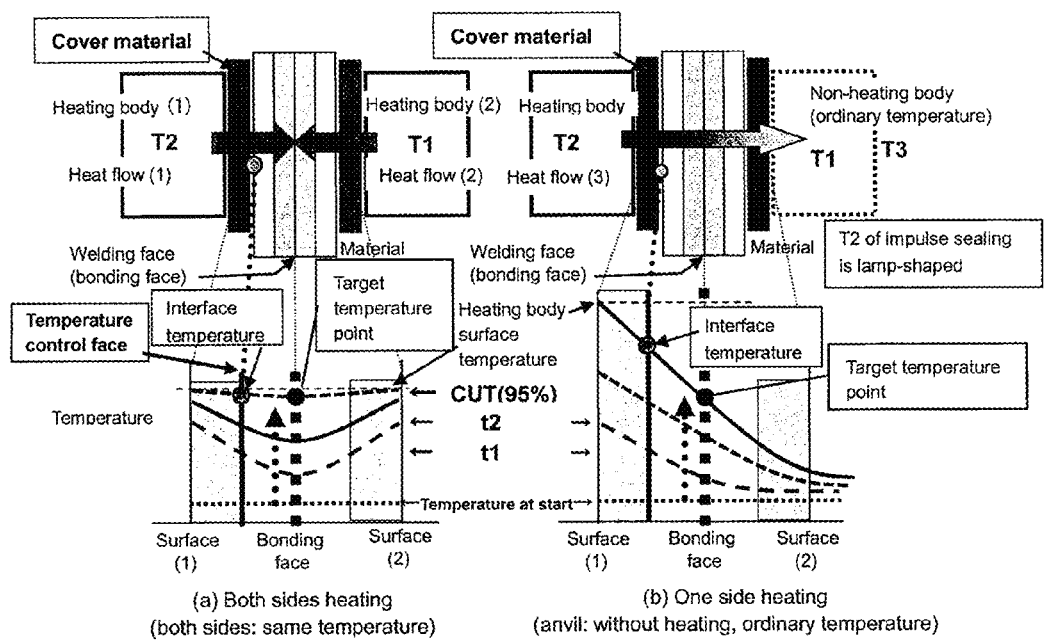

[Fig. 4]

[Fig. 6]
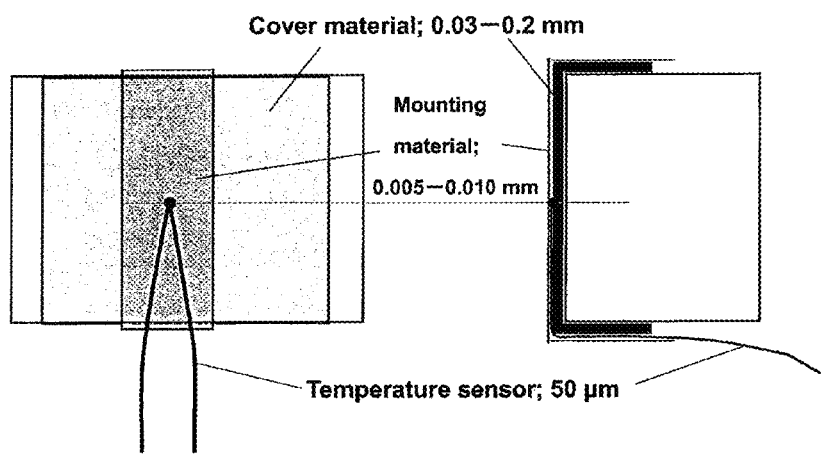

[Fig. 7]
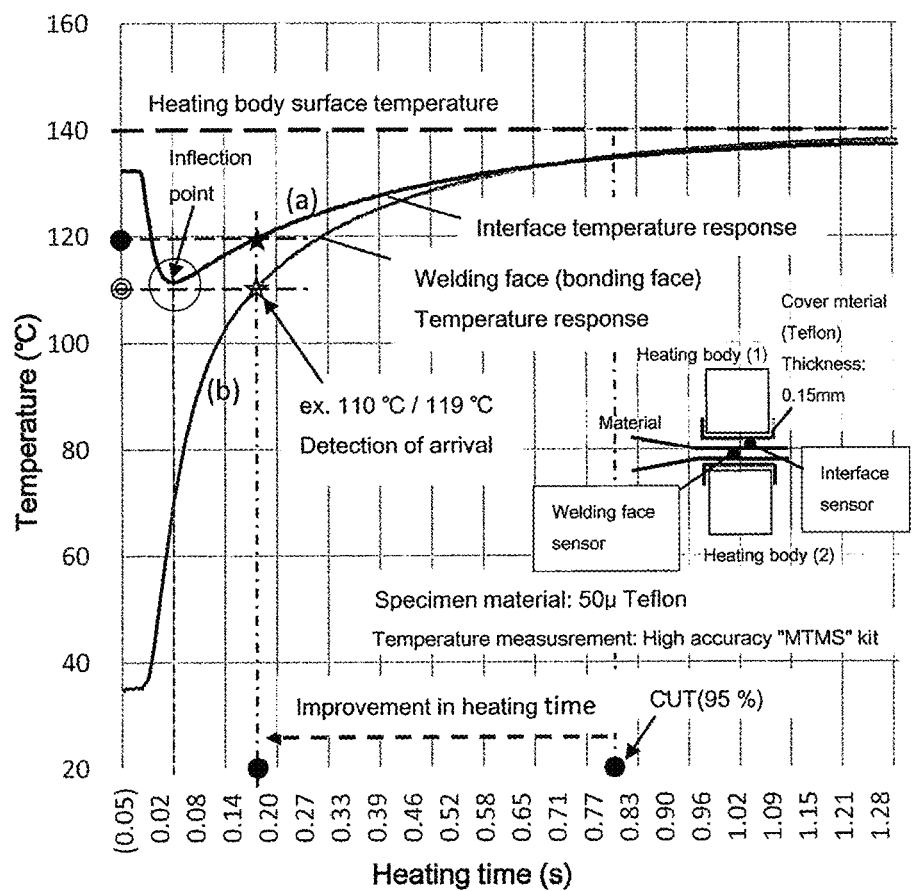

[Fig. 8]

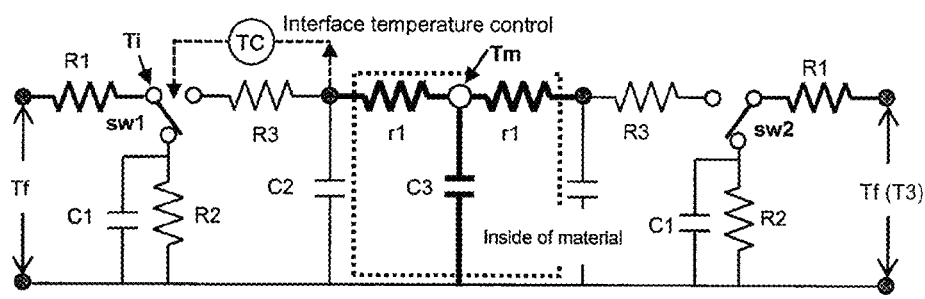

Tf; Heating element surface temperature,
Tm; Welding face (bonding face) Temperature,
Ti; Interface temperature,
R1; Heat conductivity of cover (Teflon material),
R2; Heat radiation degree at standby,
R3; Heat conductivity of contact face,
r1; Heat conductivity of material,
TC; Temperature controller,
C1; Heat capacity of heat radiation system,
C2; Heat capacity of material surface,
C3; Heat capacity of material,
SW; Contact / release of heating bar (by TC)

* In case of impulse sealing;
Tf = T3 (room temperature)
Heat flow is one side of Tf
→ T3

[Fig. 9]

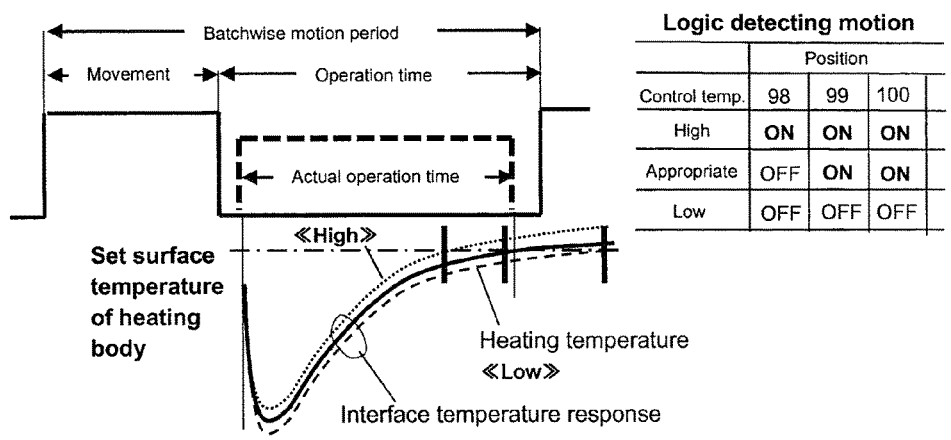

Logic detecting motion

| Control temp. | Position | | |
|---|---|---|---|
| | 98 | 99 | 100 |
| High | ON | ON | ON |
| Appropriate | OFF | ON | ON |
| Low | OFF | OFF | OFF |

[Fig. 10]
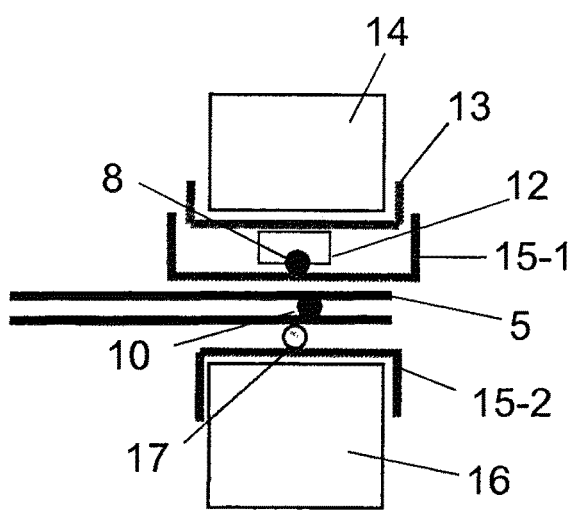

[Fig. 11]
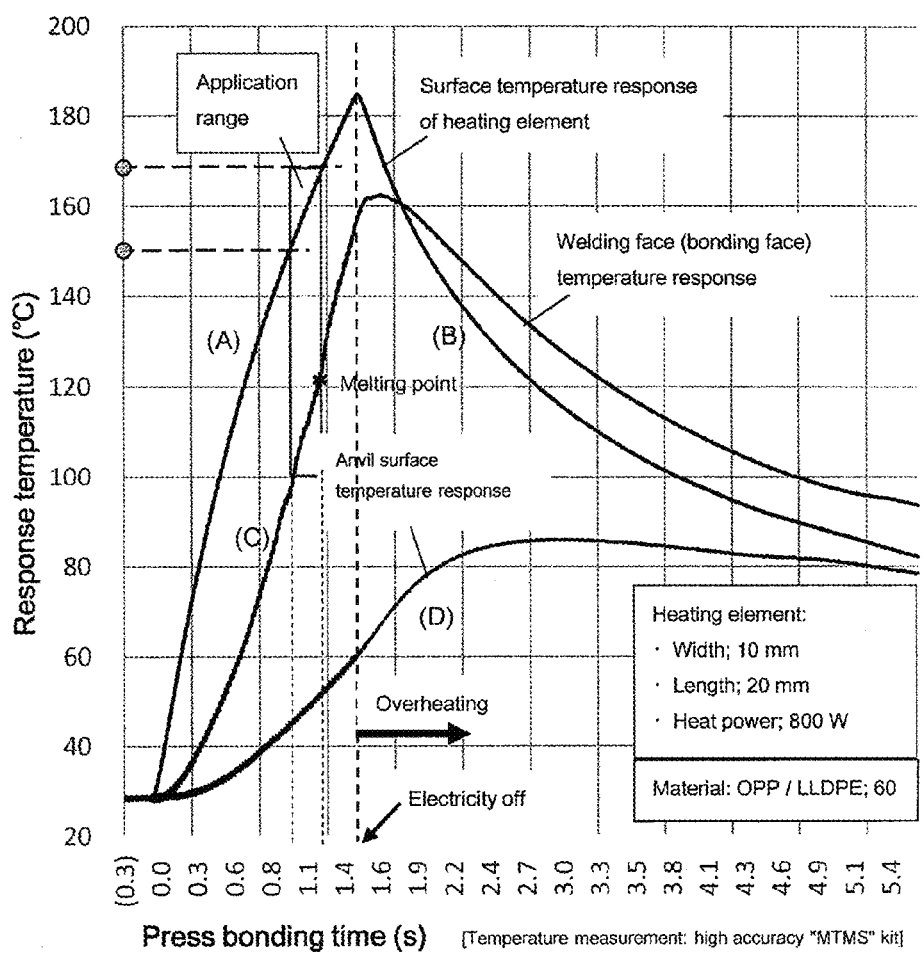

[Fig. 12]
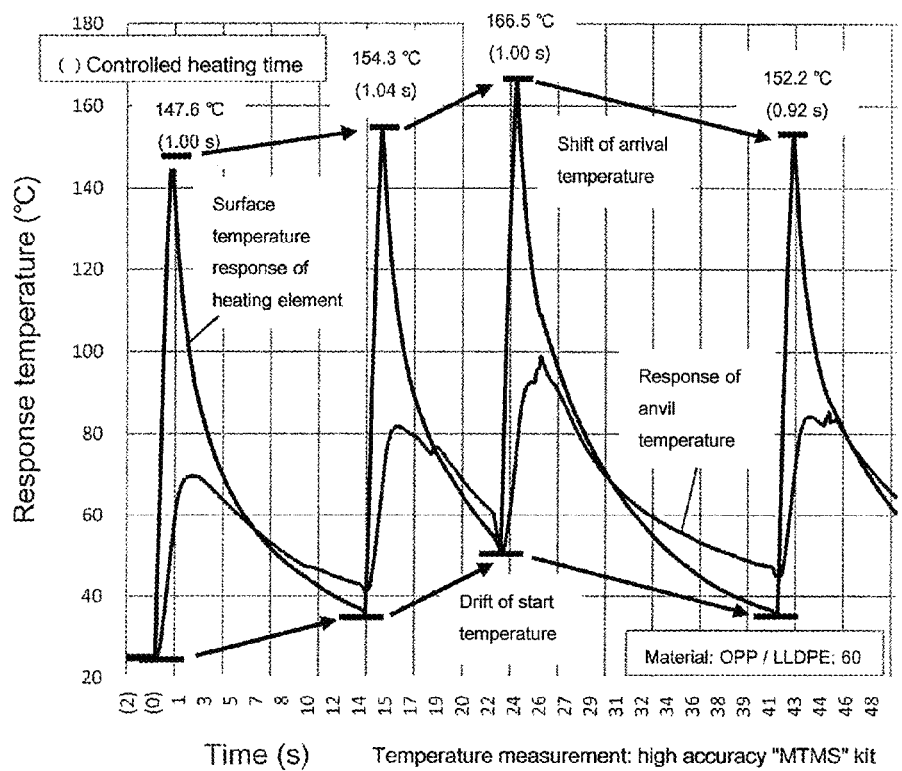

[Fig. 13]
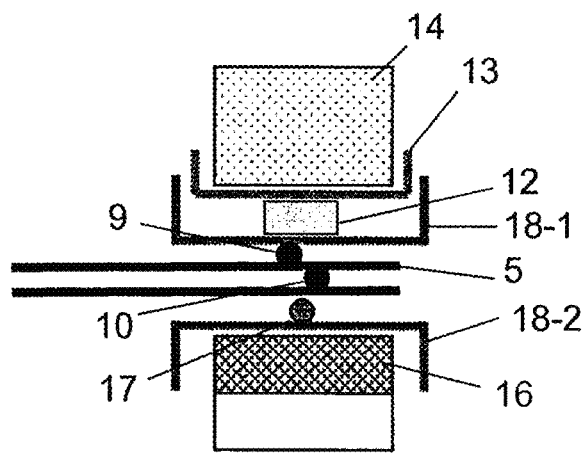
Sectional view
[Fig. 14]
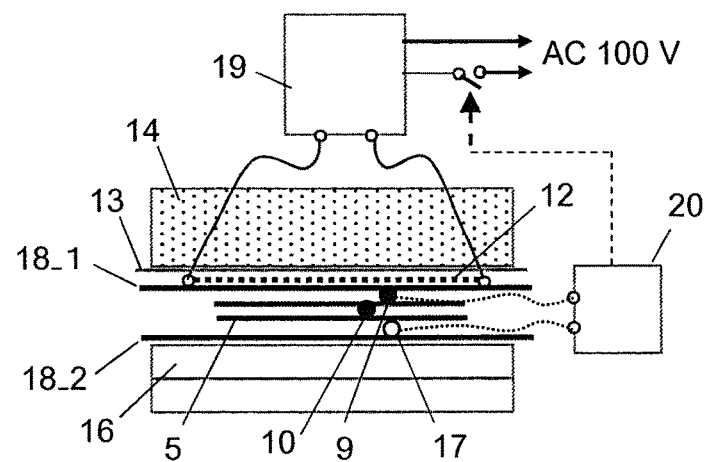

[Fig. 15]
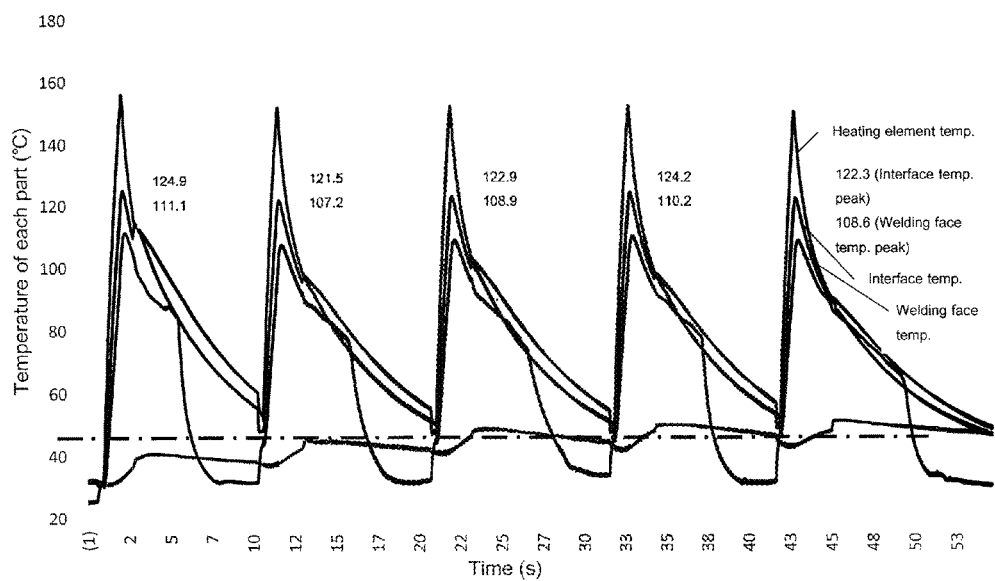
[Fig. 16]
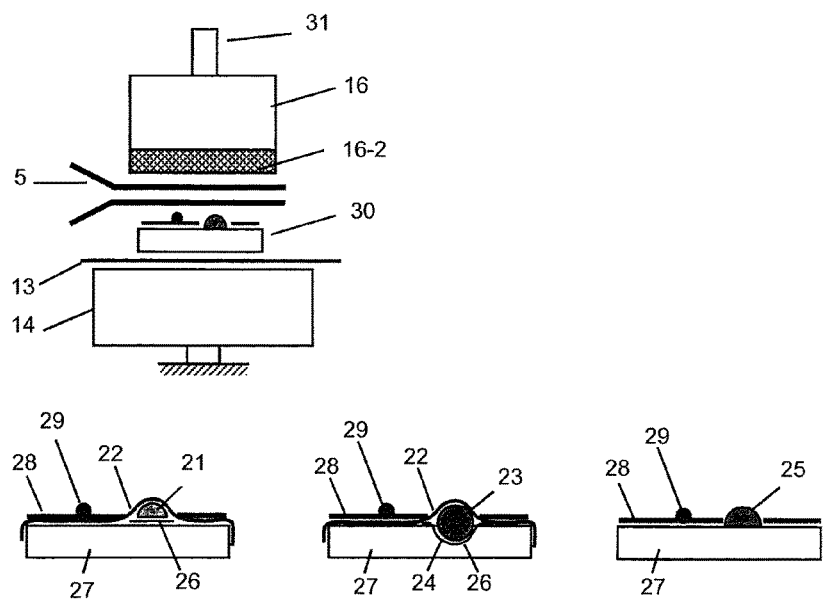
Type (a) Half cut rib  Type (b) channel digging type rib  Type (c) Drawing type

[Fig. 17]
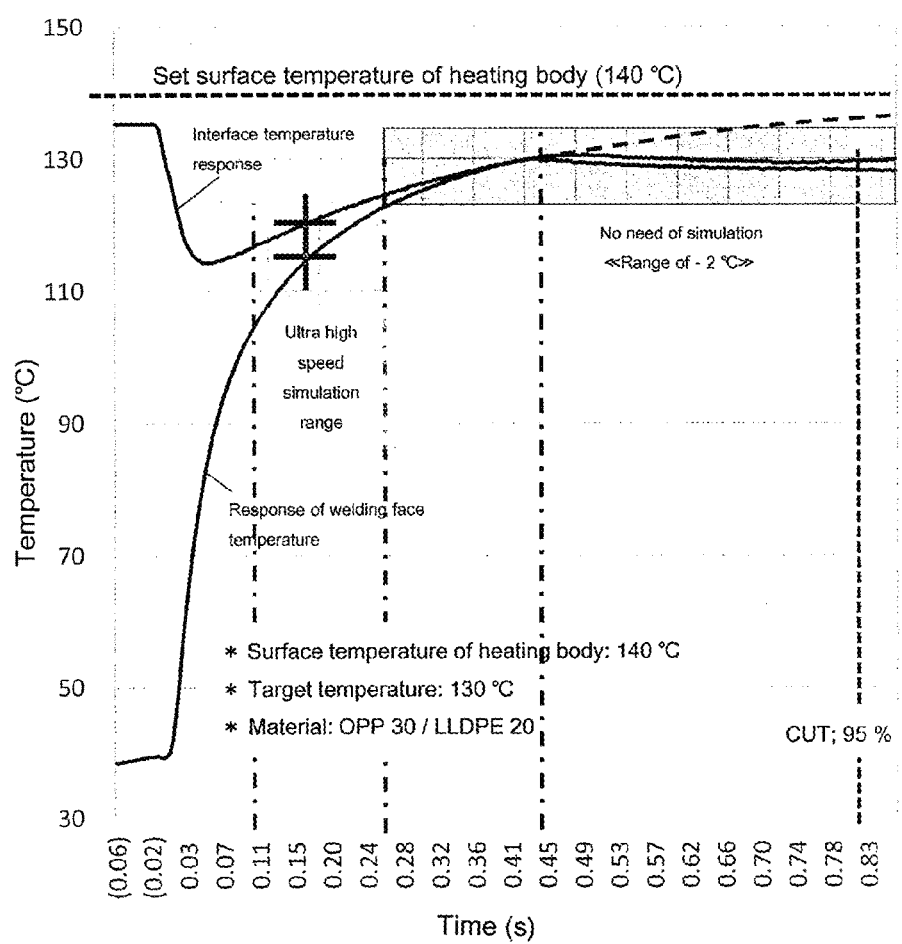

[Fig. 18]
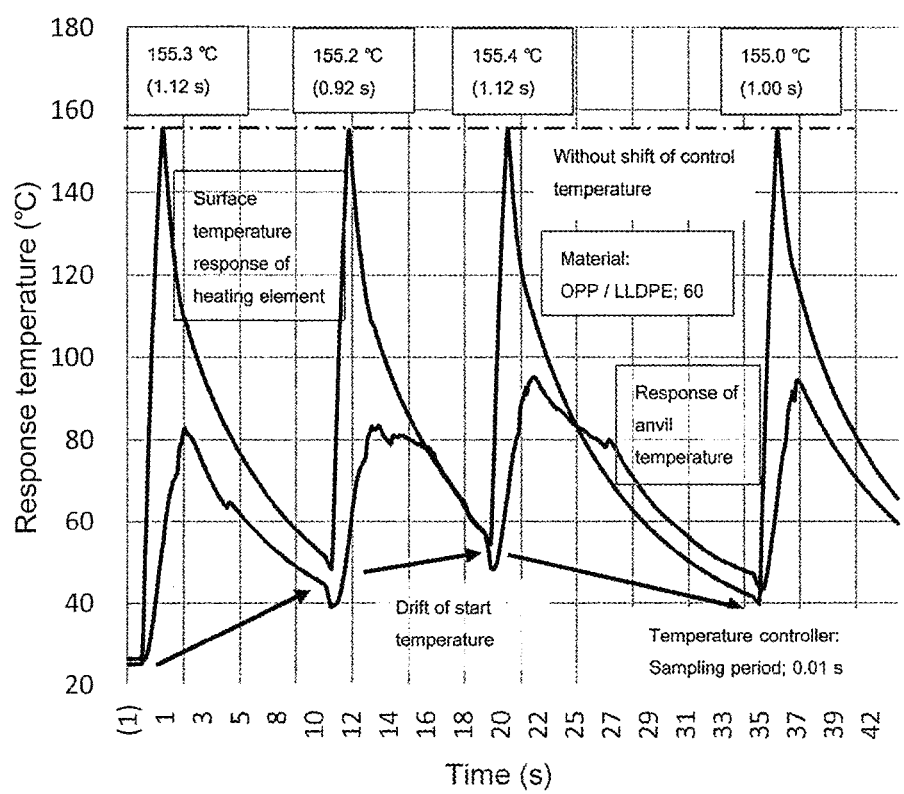

HEAT SEALER PROVIDED WITH INTERFACIAL TEMPERATURE SENSOR

RELATED APPLICATIONS

The present application claims priority from Japanese application No. 2019-128661 filed on Jul. 10, 2019, the disclosures of which is hereby incorporated by reference herein in its entirety.

TECHNICAL FIELD

This embodiment relates to a heat seal system capable of controlling heat seal temperature appropriately.

BACKGROUND ART

For the bonding of plastic films and sheets in a process of bag making and sealing, heat-sealing techniques are frequently used. In the process, a heating body is pressed on the surface of a heat seal material (hereinafter, occasionally referred to as "work"), so that the contacting faces of the heat-seal material are heat-sealed by utilizing the heat conduction of the heat seal material. The heat-bonding method or heat-sealing method has been commonly used. (ASTM F88 established in 1968).

The heating methods are classified broadly into (1) a method of heating the material from both sides simultaneously by a pair of heating bodies utilizing heat conduction (i.e., heating jaw system), (2) one side heating which utilizes heat conduction from a surface of the heat seal material and is constructed by a heating body only on one side, and (3) a method of local heating near bonding faces (i.e., ultrasonic heating, magnetic induction heating, dielectric loss blowing hot air, etc.).

The heat bonding or heat-sealing method utilizes the thermoplasticity phenomenon of plastics.

Heat bonding occurs within a peelable seal zone (i.e., interfacial bonding zone) of the work, where the bonding strength increases along with the elevation of the heating temperature at the bonding faces of the work. When the heating temperature reaches at a predetermined value or more, the bonding faces become melted and become paste-like state. After the bonding faces are cooled down, both bonding faces of the work are integrated by the agglomerated bonding. FIG. 1 shows the results of the tensile test of specimens obtained from each heating temperature. As shown in FIG. 1, one can tell that the heating temperature and the heating speed are parameters of the heat seal strength (Hishinuma effect).

In general, the range of an interfacial bonding temperature zone is 3-8° C. When the heating of bonding faces is adjusted to the boundary temperature zone between the interfacial bonding temperature zone and the agglomerated bonding temperature zone (i.e., adequate temperature zone), the edge-cut can be prevented by utilizing peel energy at bonding faces, thus, properties of each material can be utilized optimally. Furthermore, insufficient heating and overheating are suppressed so that the excellent quality of the heat seal is ensured.

In order to analyze the characteristics of the conventional heating jaw system, which uses the surface temperature of the heating body as a parameter, the temperature responses of the temperature sensor (hereinafter, "temperature response(s)") were measured at the welding face (bonding face) of the work in a laboratory scale, applying the method of measuring the welding face temperature described above. The results are shown in FIG. 2.

(1) in FIG. 2 shows a temperature response in the case that the surface temperature of the heating body is set at the controlled temperature Ts. Theoretically, the arrival time at Ts is an extremely long time. This is referred to as (tc).

(2) in FIG. 2 indicates a temperature response of the welding face (bonding face) at the heating temperature of about 1.05 times Ts, where the 95% temperature response becomes Ts. The arrival time is referred to as (tb).

(3) in FIG. 2 indicates a temperature response of the welding face (bonding face) in the case that the heating temperature is raised to (Ts×1.5), in order to arrive at Ts faster than that takes for 95% temperature response. Such arrival times are referred to as (ta).

(4) and (5) in FIG. 2 show the cases where the heating temperature changed in order to arrive at Ts in further shorter period of time. The characteristics are explained in the next paragraph.

Based on the examples shown in FIG. 2, the relationship between the arrived temperature upon heating by heating bodies on both sides at the same temperature and the heating time are classified into three types of response patterns, i.e. (1) converging equilibrium temperature (Tc) heating, (2) 95% arrival point (Tb) heating, and (3) high speed temperature rising region (Ta). The characteristics of the three response pattern types are:

(1) Equilibrium temperature (Tc) heating: It utilizes a principle that the welding face temperature of the work converges equilibrium to the surface temperature of the heating body. Although a longer time than other methods is required until completing the heating process, operations with a basic temperature is possible. For the heat seal test in laboratories, this method is most likely chosen.

(2) 95% arrival point (Tb) heating: The heating time is set for a target temperature of (heating body surface temperature−environmental temperature)×95%+environmental temperature. Because the temperature difference from the equilibrium temperature and Tb is within 5° C., and the variants of the temperature are within 2° C. with respect to the variants in controlling heating time, this time-setting temperature control system (hereinafter referred to "time limit system") is highly practical.

(3) Utilization of the initial high speed temperature rising region (Ta): Because the time to reach the predetermined heating temperature is short in order to complete a single operation in a short period of time, the productivity is high. A temperature increment at the 95% temperature arrival point is ≈3° C./0.1 s, whereas that in the initial high speed temperature rising region at 0.4-0.5 s is as quick as ≈10° C./0.1 s.

Today, an appropriate technique to control the welding face (bonding face) temperature has not been fully established in heat bonding techniques, and the heating operation in the initial high speed temperature rise region is at most conducted by controlling the time based on the arrival time of a certain temperature.

However, the conventional methods described above do not satisfy the requirements of the highly accurate temperature control and the high speed press-bonding operation to form peelable sealing and the like, having a narrow temperature range to obtain the characteristics.

In the conventional technique, productivity is prioritized, and the heat is generally controlled based on the initial high speed temperature rising region (Ta) described in (3). However, highly accurate techniques to control the press-bonding time and the temperature is not established. In practice, insufficient heating is avoided by setting the heating temperature with extra heat of about 10° C. Accordingly, the bonding state tends to be an agglomerated bonding, which is bonded by the excess heat beyond the boundary temperature region shown in FIG. 1. Meanwhile, the heat process that utilizes the excess heat is difficult to adjust for a weaker interfacial bonding such as easy-peel sealing. The solution to this problem has been strongly desired worldwide.

In this regard, the prior art discloses a heat sealing method of setting the temperature of the heating body and the press-bonding time, based on the temperature obtained by mounting temperature sensors on a surface of the heating body and between welding faces of test pieces (Patent Document 1) Another prior art discloses a method of controlling heat seal temperature based on the temperature obtained by mounting surface temperature sensors in the vicinity of the heating source and a surface of the heating body (Patent Document 2).

PRIOR ART DOCUMENT

Patent Documents

[Patent Document 1] JP 3465741
[Patent Document 2] JP 4623662

SUMMARY OF THE INVENTION

Problems to be Solved by the Invention

Heretofore, there is a standard regarding the accuracy of temperature control of a heating body (heating bar) (ASTM F2029; 2000). The surface temperature of the heating body has an unevenness of the heating temperature at a heat bonding face is 10° C. or more caused by the complexly of the size and form of the heating body, the position of heating source, heating unevenness of a heater, the position of a detecting sensor, control speed, mounting method, heat dissipation (heat insulation), etc. However, in order to exhibit inherent properties of works (plastic material), it is required to suppress the variation of welding face temperatures within 3° C.

Conventionally, the time limit system is employed, in which the pressing time of the heating body is controlled. In the conventional system, the pressing time is set by relying on visual inspection of actually produced specimens as well as the tensile test results (JIS Z 0238, ASTM F88) obtained by sampling of part of specimens. In absence of an accurate press bonding control method, the agglomerate bonding, where a constant value of heat bonding (heat seal) strength is observed, has been recommended (JIS Z 0238).

For the purpose of maintaining stable heat bonding quality, it is expected to develop a technique to directly control the welding face (bonding face) temperature, which is an essential parameter.

Every temperature control method previously developed by the inventor involves a preliminary experiment, where a temperature sensor is nipped between heat bonding faces of test pieces, and the temperature sensor is inevitably incorporated in the test pieces after heat seal. Therefore, in the heat-sealing by a sealing machine, the control of temperature is relied on time control based on the data obtained by the preliminary experiments.

Meanwhile, if the heat-sealing temperature can be traced in a sealing machine, the heat seal temperature can be controlled more accurately.

An object of the embodiment is to provide a means capable of controlling more accurate heat-sealing temperature by measuring the varying temperatures at a specific location in the heating system on a heat-sealing apparatus on a real-time basis.

Means for Solving Problem

The heat that flows from a heat source to a heat seal material relates directly to the temperature of the welding face (bonding face). In order to simulate the temperature response at the welding faces, a minute temperature sensor is mounted on the surface of a covering material on the heating body. The minute temperature sensor detects temperature difference based on the heat flow in the temperature rise region. The measurement of the interface temperature between the covering material and the heat seal material is actually equivalent to the measurement of the surface temperature of the heat seal material.

Explanation of the welding face temperature response formula

A schematic view of a heating jaw system is illustrated in FIG. 3. FIG. 3 (a) indicates a variation of the temperature distribution in the work, where heating temperatures of a pair of heating bodies in the heating jaw system were adjusted to the same.

On the other hand, FIG. 3 (b) indicates a variation of the temperature distribution in the work, where the temperature of the only one of the pair of heating bodies in the heating saw system was adjusted, but the other was allowed to stand at room temperature.

When the heating body is pressed on the work in a short period of time, the temperature response of the welding face (bonding face) can be found by step response.

The definitions of T1, T2, and T3 are indicated in FIG. 3. Provided that a constant determined by the heat conductivity of the material and the heat capacity, such as a thickness, is denoted as a time constant k, and the environmental temperature is denoted as T3, the welding face temperature response including heating from both sides in the heating jaw system is expressed by the following formula, as a general formula (see FIG. 3).

$$Tb=[T2-(T2-T1)\cdot n]\cdot(1-e^{-kt})+T3 \quad (1)$$

Wherein Tb is the aforementioned temperature of the 95% arrival point, and T1 and T2 are surface temperatures of each heating body. n is expressed by $$n=(R1+R3+rl)/2(R1+R3+rl) \quad (2)$$

and k is k=RC defined by an electric circuit of a first-order lag constructed with resistors and condensers. In the circuit diagram of FIG. 4, R=R1+R3+rl, C=C3. t represents time.

When the both of the pair of heating bodies are heated at the same temperature, T2=T1. Therefore, results in the response shown in FIG. 3 (a) which is determined only by the heat source temperature T2, thus, the temperature response of the bonding face eventually constricts to T2.

When an anvil is rendered at room temperature, T1=T3, it becomes a first-order lag as shown in FIG. 3 (b).

n is a factor determined by the heat conductivity of the material facing the heat bonding face. Provided that the materials facing are identical, n=½.

Commonly, although the heating in the heating jaw system is classified into two types that are both sides heating and one side heating. Because they are only different in temperature setting of each heating body, practical deficiencies in the both types of heating system can be dealt systematically as their limiting conditions is a temperature setting.

Explanation of Characteristics of Both Sides/One Side Heating (1) Characteristics of Both Sides Heating The both sides heating is a press heating by a pair of metal bodies including heating source. Bonding faces of the work are heated from the surfaces of the work by utilizing heat conduction of the material. It has characteristics that the bonding face temperature is equilibrated with the surface temperature of heating bodies without influence of other factors such as an environmental temperature by maintaining the same temperature at contact faces of the pair of the heating bodies and the material.

(2) Characteristics of One Side Heating

One side heating is constructed with a heating body on one side and, a pressure pad at room temperature without heating function on the other side. Applied heat flow that is proportional to the temperature difference between the surface temperature of the heating body and the pressure pad at room temperature flows in one-way direction, and passes through the bonding faces of the work. In an equilibrium state, it is equilibrated around a half of the difference of the surface temperature between the heating side and the pressure receiving side. However, when heating time is prolonged, the surface temperature of the pressure pad is gradually elevated by the heat flow passing through the bonding faces. About a half of the temperature elevation directly affects the changes in the bonding face temperature which gradually rises with the heating time, and inhibits appropriate bonding face temperature control. Note that the impulse sealing system belongs to the one side heating.

Namely, one of embodiments provides a method of heat-sealing using a heat-sealing apparatus which heat-seals a heat seal material by pressing a heating body on the heat seal material. The method comprises, mounting a cover material on the surface of the heating body to be in contact with the heat seal material, attaching a minute temperature sensor to the surface of the cover material on the side to be in contact with the heat seal material, and controlling temperature of the welding face of the heat seal material based on the temperature detected by the minute temperature sensor.

Effects of the Invention

In the conventional heat bonding (heat seal) in situ, transient heating in a high speed temperature rise region is utilized for the purpose of ensuring productivity. Since instrumentation and control techniques capable of directly managing the parameter of the heating temperature have not been established in the conventional temperature controlling system using the high speed temperature rise region, management of a heating operation relying on time control is not very accurate. In contrast, the embodiment capable of controlling the heating temperature directly in the high speed temperature variation region has solved the problems in the conventional system, and has improved the reliability and quality of heat seal techniques. Further, the embodiment has ensured to solve the ultimate problem of sealing and easy-opening sealing of the plastic films.

BRIEF DESCRIPTION OF THE DRAWINGS

FIG. 1 is a graph indicating a relationship between bonding strength and the bonding face temperature.

FIG. 2 is a graph indicating a relationship between the welding face temperature and the press bonding time, where the surface temperature of the heating body is employed as a parameter.

FIG. 3 is an explanatory drawing explaining the heat flow and in the at both sides heating and one side heating of the heating jaw system.

FIG. 4 is a schematic view illustrating a schematic construction of a heat sealing apparatus of the heating jaw system to which the embodiment is applied.

FIG. 6 is a plan view and a side view illustrating the embodiment shown in FIG. 5B.

FIG. 7 is a graph showing a relationship between the interface temperature and the welding face temperature obtained by the method in the embodiment.

FIG. 8 is a circuit diagram where the heat transfer phenomenon is expressed in the electric circuit.

FIG. 9 is an explanatory drawing explaining a manner to apply the method in the embodiment to the intermittent motion of the heating jaw system.

FIG. 10 is a drawing illustrating a construction of a conventional impulse sealer.

FIG. 11 is a graph showing the temperature variation in the heating element, the welding face and the anvil, in the impulse sealer.

FIG. 12 is a graph indicating a temperature variation in repeated sealing operation using a conventional impulse sealer.

FIG. 13 is a drawing illustrating a construction of an impulse sealer to which the embodiment is applied.

FIG. 14 is a drawing indicating the temperature control mechanism thereof.

FIG. 15 is a graph showing temperature variation and controllability at the heating element, the outer surface of the cover material and bonding faces between works in repeated sealing operation using an impulse sealer to which the embodiment is applied.

FIG. 16 is a drawing illustrating conditions to which the single linear heat sealing of the embodiment is applied.

FIG. 17 is a graph showing a relationship between the interface temperature and the welding temperature obtained in an example of the embodiment.

FIG. 18 is a graph showing temperature variation in a repeated sealing operation in an example of the embodiment.

MODE FOR CARRYING OUT THE EMBODIMENT

Figure 5A:
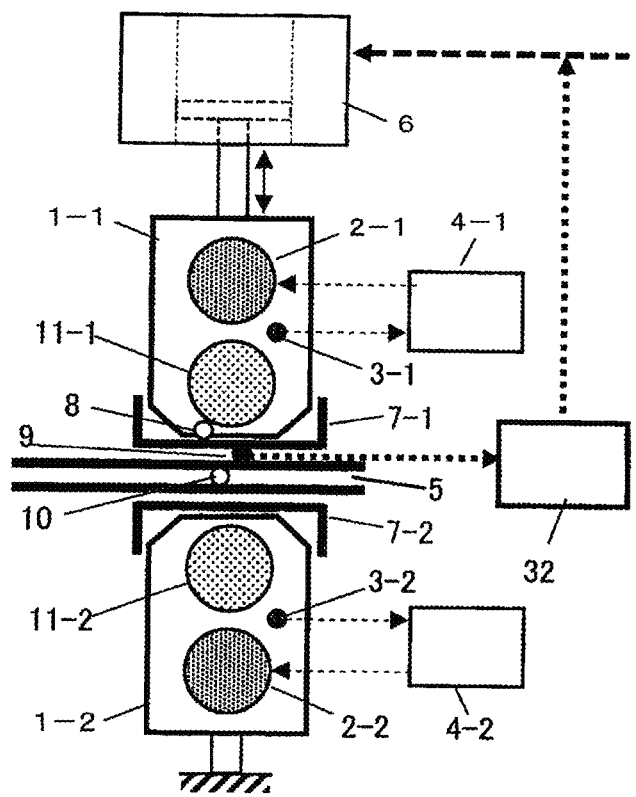
FIG. 5A and FIG. 5B are schematic views illustrating two variations of mounting states of the interface temperature sensor in FIG. 4.

Heat seal materials may be films or sheets that are capable of forming a heat-sealable layer. Such films or sheets may be formed of a single layer or a plurality of layers. The material of the heat-sealable layer may be any material capable of heat-sealing, such as polyethylene, polypropylene, ethylene copolymers or the like. In addition, non-crystalline polyethylene terephthalate and the like are also usable. The thickness of the heat-sealable layer is usually about 3-200 μm, typically about 5-150 μm without limiting specifically thereto.

The film or the sheet composed of a plurality of layers is constructed by laminating two or more types of materials in order to improve printability, resistance to breakage, or gas barrier ability, to adjust rigidity of bags, to prevent from adhesion of the material in a softened state to the heating plate, or the like. An adhesive layer (sealant) which is the heat-sealable layer, is arranged on to at least one of the surface layers. The material of the surface layer which becomes an outside layer of the bag, is selected from the materials wherein plasticization does not occur within a temperature range for heat-sealing of the adhesive layer.

The thickness of the film or the sheet composed of a plurality of layers is usually about 2-200 μm, typically about 20-120 μm, without limiting specifically thereto.

Representative heat seal systems include a heating jaw system where heating bodies are used, and an impulse sealing system where a heating element is pressed against the work, and electricity is charged for heating. The embodiment can be applied to the both systems.

The heat sealing apparatus of the heating jaw system is basically composed of a pair of heating bodies, their actuating mechanism, and a heating mechanism. The heating bodies are basically the same as those of a conventional heat seal apparatus, and the pair of the heating bodies are constructed and arranged so that the heating surfaces are located in parallel, and therefore, upon heat-sealing, pressing is carried out with uniform pressure in the entire area. The heating surface is usually flat. At least, the width of at least one heating surface is made only to heat the heat seal portion to be formed on the heat seal material. The other heating surface may have the same width, or may be broader than that to be functioned as a pedestal. The material to be used for the heating bodies may be materials with a high heat conductivity, such as copper, aluminum, brass or stainless steel.

The working mechanism of the heat sealing apparatus of the heating jaw system, that nips or releases the heat seal material by the heating bodies, may be the same as a conventional heat heating jaw system. The working operation may be performed by either moving only one heating body or moving both heating bodies.

The heating mechanism to heat the heating bodies may also be the same as a conventional heat seal apparatus, and electricity is used commonly.

A schematic construction (sectional view) of a heat sealing apparatus of the heating jaw system to which the embodiment is applied, is shown in FIG. 4. It is constructed by a pair of heating bodies (heating bar) each of which includes a heater 2. Each heating body 1-1, 1-2 is equipped with a temperature sensor 3 which is connected to a temperature controller 4, and the temperature is controlled individually. An automatic pressing apparatus 6 is attached to at least one of the heating bodies 1, and it acts batchwise motion synchronized with the motion of a packaging machine body. An air cylinder is used as the automatic pressing apparatus 6, and moves the heating body 1-1 back and forth. The work 5 is brought in and taken out with a synchronized motion corresponding to the motion of the jaw. Conventionally, the heating body is provided with a Teflon (registered trademark)-impregnated glass wool woven fabric on the surface as a covering in order to prevent the work from burning. In the embodiment, a thin flat Teflon sheet or a flat nylon sheet, in which heat flows uniformly, is applied as the cover material 7.

A heating pipe 11 is embedded between the heater 2 and the surface so that the heating temperature on the surface of the heating body becomes uniform.

Temperature sensors 3-1, 3-2 are embedded in each heating bodies 1-1, 1-2. In addition, a heating body surface temperature sensor 8 and an interface temperature sensor 9 are attached to the outer face of the cover material 7-1.

The interface temperature sensor 9 is introduced by one of the the embodiments, and only the top portion of the sensor is placed on the interface through a minute hole bored into the cover material. The size of the aperture of the hole is usually about 0.05 to 0.1 mm and the end portion of the sensor is exposed to the heat seal material through the hole. As a result, only a minute trace of about 0.1 mm is formed on the heat sealing face.

A mounted state of the sensor is illustrated in FIG. 5A. Since the heating body 1 is made of metal, an insulation film is laid on the heating body 1 in order to electrically protect the lead wire of the sensor. The applied insulation film is a polyimide film ("Kapton", du Pont) having a thickness of 0.005-0.01 mm.

Figure 5B:
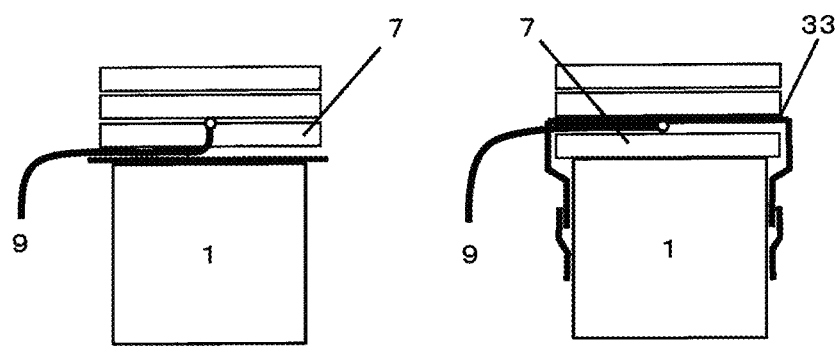

Alternatively, the interface temperature sensor 9 is mounted on the surface of the cover material 7, then covered by a stretched very thin mounting film 33, as shown in FIG. 5B and FIG. 6. The influence of the mounting film to the heat flow in the cover material is negligible. The thickness of the mounting film is very thin, such as 0.005 to 0.01 mm, and preferably one fifth of the thickness of the cover material or thinner than that. The applied mounting film is also made of the polyimide film ("Kapton", du Pont) having a thickness of 0.005-0.01 mm. The mounting film is fixed to the heating body by immobilizing the end of the mounting film using a heat-resistant adhesive tape.

The former is excellent in detectability, but not easy to mount the sensor. Although the latter is slightly inferior in detectability, it is superior in easy mounting.

The signal of the interface temperature sensor 9 is sent to an interface temperature controller 32, and thereby, the automatic press-bonding apparatus 6 is controlled.

As the welding face temperature responses signaled by sensors in the heating jaw system, there are three types: i.e. a response to the converging equilibrium temperature (Tc), a response to the 95% arrival point (Tb) and a transient response in the high speed temperature rising region (Ta), as shown in FIG. 2. Among these three types, at present, only the equilibrium temperature (Tc) can be handled directly. The actual heating method to achieve at the 95% equilibrium temperature is by way of a time control, where the temperature variation is ≈1° C./0.1 s. The 95% equilibrium temperature is approximate but practical accuracy (1-2° C.) can be acquired.

However, today, in order to ensure productivity per unit time, the heating time shorter than the 95% arrival time by a fraction of a second is commonly used in the high speed temperature rising region. Temperature rising characteristics in this region in such a system is about 100° C./s, ≈10° C./0.1 s. However, the temperature rise caused by the gaps in time control greatly exceeds the heatbond-assured temperature region and resulted in inconveniently relying on the agglomeration bonding.

For the utilization of the high speed temperature rising region in the conventional heat bonding system, it is necessary to set a heating temperature of 1.5-2.5 times higher than that of the 95% temperature response. (see FIG. 2)

Because the temperature of the heating body is set in a temperature zone much higher than the melting point of a packaging material, a brief stop such as a 10 second-stop while the material is in the heat bonding apparatus, could cause the material to melt in the apparatus and adhere to the heating body, etc., thus, contaminate the apparatus.

In the heating jaw system, as shown in FIG. 2, a short heating time (Ta) heating method is usually employed in order to increase the production speed, by setting a high temperature for the heating bodies so as to heat it up quickly.

However, in this process, the heating is controlled based on the time control, because the temperature variation in the transient stage cannot be measured directly.

It is desired to develop a control method (simulation) where the actual heating temperature is employed as a criterion, instead of the time control. The embodiment makes it possible to solve this problem.

Summary of the developments of the embodiment into the heating jaw system is explained by referring to FIG. 4. The surface of heating bodies 1-1, 1-2 is covered by a cover material 7-1, 7-2. A minute interface temperature sensor 9 is fixed to the surface of either of the cover material 7-1 or 7-2. A welding face temperature sensor 10 is provided only at a time of assessing the response in a laboratory test.

Measurement of the Surface Temperature Response of the Cover Material

In the embodiment, the welding face temperature response is simulated by referencing the surface temperature (interface temperature) of the cover material 7-1, 7-2 (e.g. 0.15 mm Teflon smooth sheet) on the heating bodies, where the surface temperature of the cover material descends as the heat flows toward the work. An example of the measurement is shown in FIG. 7.

In the measurement, a Teflon smooth sheet or a nylon smooth sheet having a thickness of 0.03-0.2 mm was selected as the cover material 7, and the responses of the surface temperature 8 of the heating body, the contact interface between the cover material and the work 5, and the welding face (bonding face) of the work were examined. The graph (a) in FIG. 7 shows a response of the contact interface temperature sensor 9 between the cover material 7 and the work 5. The graph (b) shows a response of the welding face temperature sensor 10.

In the measurement of this example, the spaces between the welding face and the interface temperature sensor are a few tens of micrometers. Moreover, a highly accurate instrument capable of measuring the 95% response with a resolution ability of 0.05 s or less is required. In the measurement, a K thermocouple of 50 μm φ and a temperature recording device with a resolution ability of 0.001 s were used.

The welding face temperature response is obtained by monitoring the surface temperature response from the sensor attached on the cover material. Because the surface of the cover material is exposed to room temperature and radiates heat prior to the operation, the surface temperature of the cover material indicates a lower temperature than the surface temperature of the heating body. (i.e., The surface temperature of the cover material is about 130° C., when the surface temperature of the heating body is controlled at 140° C.). (see FIG. 7).

When the work at room temperature comes into contact with the surface of the cover material A 7-1, the interface temperature sensor 9 detects a sharp descend of the interface temperature. Then, the interface temperature rises asymptotically to the surface temperature of the heating body. (see FIG. 7 graph (a))

The temperature at the welding face of the work begins to rise simultaneously, and rises asymptotically to the surface temperature of the heating body. When the difference between the welding face temperature response and the interface temperature response are 2° C. or less, the welding face (bonding face) temperature may be directly controlled by referring to the interface temperature as criteria. One of embodiments in FIG. 17 indicates that an appropriate timing of the occurrence of this temperature condition is from the vicinity of 0.4 s after applying heat to the heating body. As shown in FIG. 17, "CUT; 95%," is in the vicinity of 0.8 s in this embodiment. Compared to the time required to achieve the CUT; 95% in the conventional heat sealer, the embodiment indicates that a greater time is saved, and the effectiveness of the embodiment can be understood. The detailed explanation is described in connection with a working example below. (see, FIG. 17).

Although the welding face (bonding face) temperature cannot be detected directly in the actual manufacturing process, the graph (a) in FIG. 7 can be continuously observed by attaching a minute sensor to the interface for measuring the welding face temperature. The graphs (a) and (b) in FIG. 7 occur by the same heat flow phenomenon. Accordingly, based on the observation of changes in the interface temperature indicated in graph (a), the welding face temperature response can be obtained directly. This measuring technique is the basis of the embodiment.

The Principle Governed by the Interface Temperature

The characteristics of the heat transfer phenomenon during the heat bonding are analyzed by expressing the heat transfer phenomenon with an electric circuit diagram. The response of the heat flow phenomenon in FIG. 7 is described in an electric circuit diagram shown in FIG. 8.

In a released condition of a pair of the heating bodies from the work prior to pressing, the surface temperature of the cover material 7-1 is expressed as $Tf \cdot R2/(R1+R2)$, provided that the heat radiation resistance into the atmosphere is denoted R2, and the heat transfer resistance of the cover material 7-1 is denoted R1. Therefore, the surface temperature of the cover material 7-1 is lower than the surface temperature of the heating body.

When the heating body 1 executes a jaw motion (switching SW in FIG. 8) to perform press bonding, the heat flow from the heating bodies 1-1, 1-2 is charged into the heat capacity C3 of the welding face through the heat transfer resistance R1 of the cover material 7, the contact resistance R3 and the heat resistance r1 of the work 5. The welding face heat is generated with approximately a response of a first-order lag. In the both sides heating type of the jaw system, similar heating is also applied from the other side of the jaws, and the temperature of the welding face becomes asymptotic to the surface temperature of the heating body and equilibrates with Tm.

In the case of heating where the predetermined heating temperature of the heating body 1-1 is different from the other heating body 1-2 (so-called one side heating) in the pair of heating bodies, the temperature of the heating body 1-2 is T3, which may be room temperature, and the like. When the heat is applied to the work, the heat flow corresponds to (Tf−T3) and the flows in one direction from the heating body 1-1 to the heating body 1-2. Therefore, provided that the surface temperature of the heating body 1-2 is not changed by the heat flow, the welding face temperature response is expressed as $$(Tf-T3) \cdot [(R1+R3+r1)/2(R1+R3+r1)] + T3 = (Tf-T3) \cdot \tfrac{1}{2} + T3 \qquad (3)$$

The above (3) equation also applies to the operation of the impulse sealing.

The response of the interface temperature 9 indicates a transient response between the thermal resistance R1+R3+r1 and mostly the heat capacity C3. As can be seen from an analogous electric circuit, the welding face temperature constitutes part of interface temperature response, and is correlated with each other.

Accordingly, it was found that welding face temperature response can be simulated by monitoring the surface temperature response of the cover material which can be measured continuously.

Selection of a Thickness of the Cover Material

The thermal resistance R1 of the cover material directly affects the detection of the heat flow. The greater the thermal resistance R1 value, the greater the temperature descent, thus, the detection sensitivity becomes high. However, when the thermal resistance R1 is great, the temperature of the heat source raises due to the suppression of heat flow, and therefore, undesirable. Accordingly, it is selected so that R1/(R1+R3+rl) is made in a ratio of 1/4-1/5.

In FIG. 7, it is shown a procedure to control the welding face temperature at 110° C. in the vicinity of 0.2 s of the heating time, as an example. Based on the model data, the welding face temperature becomes 110° C., when the interface temperature of the cover material is 119° C. The heating operation using the temperature of the model data as a criterion can be conducted by releasing the pressing of the automatic pressing apparatus actuated by the interface temperature controller 32, when the interface temperature detects the predetermined value of T<119° C., which is obtained by subtracting the operational time lag of the heating jaw.

Because the model data varies depending on the work, the laboratory data for each work are stored for future references.

Because the interface temperature mostly correlates with the welding face temperature response, the automatic pressing apparatus 6 may be operated by the detected interface temperature signal without referring to the model data in selecting the heating time around 0.4 s or more.

The selection of the control time zone can be adjusted by the changing the temperature (T1, T2) setting of the heating bodies 1-1, 1-2.

Most of conventional intermittent motion type packaging machines are driven by a single power source, and the driving mechanism of the heating jaw is constructed by cam/link. Therefore, in order to control pressing motion based on the detection of the interface temperature in the embodiment, it is necessary to furnish individual operation units.

Means of Adapting the Embodiment to the Intermittent Motion Type Packaging Machines Thereupon, it was devised an application method of the embodiment corresponding to the interval of the intermittent motion of the intermittent motion type packaging machines.

The periodic speed of the intermittent motion is frequently set by the production schedule of each occasion.

In order to obtain similar effects to the release operation of the pressing operation in the heating jaw system, the heating body surface temperature may be adjusted so as to achieve the pre-set temperature at the end point of the intermittent motion.

The device is characterized by automatically conforming with the heating operation almost 100% of intermittent motion intervals while unnecessary high temperature heating can be prevented. The construction of the method is shown in FIG. 9.

Adjusting predetermined temperature with intermittent motion time.

As shown in FIG. 9, in the packaging machine in situ, it is unusual to operate the press-bonding operation independently, and the cam/link mechanism corresponding to the intermittent motion of the machine is restricting the heating time for the press-bonding motion. In such a mechanism, the temperature is set at the 100% positional arrival time of the intermittent motion, so that the higher temperature setting more than necessary for the heating body can be avoided.

For example, positional signals corresponding to the 98%, 99%, and 100% arrival time in the intermittent motion are obtained from a rotary encoder controlling the intermittent motion, in order to make an AND logic of the interface temperature and the positional signals.

The AND logic of three positional signals of the rotary encoder and the output signal of the interface temperature sensor is expressed as a matrix shown in FIG. 9.

In the experiment of this example, first, conditions where the positional signals corresponding to the 98%, 99%, and 100% positional arrival time and a ON-state of the logic outputs of the desired controlled temperature were observed, then, the predetermined values of the controlled temperature of two heating bodies were manually adjusted by repeatedly increasing or decreasing the controlled temperature by 1° C. increment so that the logic outputs for 99% and 100% positional arrival time became the ON-state. In a practical production operation in situ, an indicator of logic outputs is displayed in the control system so as to manually or automatically change the temperature setting.

The embodiment can be applied to the impulse sealing system as well.

A construction of a conventional impulse sealer is illustrated in FIG. 10.

A heating element 12 is fixed to a heat dissipation material 14 via a thermal insulating material 13 made of Teflon (registered trademark). The other face of the heating element 12 is covered with a Teflon material (Teflon impregnated glass wool woven fabric) 15-1 to reduce burning of melted pieces of the work 5. An anvil 16 made of rubber is also covered with a Teflon material (Teflon impregnated glass wool woven fabric) 15-2 to prevent burning of melted pieces of the work 5.

The commercially available heating element 12 of the impulse sealer uses a nichrome wire as a heating resistor, and the heat is generated by applying electricity stepwise. Because the heating resistor is a thin plate of about 0.15 mm, it is characterized by a small heat capacity and a high speed heating at 100° C./0.5-1 s.

The impulse sealing system carries out heating and press-bonding simultaneously by applying an impulsive electric voltage. Therefore, the impulse sealing system is different from the jaw system where pre-heated heating bodies are pressed. Although the temperature rise of the heating element is mostly a first-order lag response to the applied electricity, a ramp input is carried out to the work where linear heating is applied. The time limit system similar to the aforementioned Ta is applied to the desired heating temperature control.

In the impulse sealing system, the supply time of electricity is controlled by a time limit system using a timer, and the operator adjusts the limiting time by judging the suitability of the bonding state of finished specimens based on a tensile test or a visual observation at each operation. Establishing the quantification of the limiting time is a problem to be solved. Because the impulse sealing's heat element has a small heat capacity, heating properties (speed) varies by the effect of the heat load capacity, mainly due to the thickness of the work.

FIG. 11 indicates an example of the welding face temperature response in the impulse sealer system by using a "MTMS" kit. Temperature sensors were respectively attached to a surface of the heating element 12, a space between two sheets of the work 5 and the cover material 15-2 of the anvil 16 in the impulse sealer of FIG. 10, so as to measure the surface temperature of the heating element 12, the welding face (bonding face) temperature, and the surface temperature of the anvil 16 (elastic body) respectively.

As an exemplary measurement, a voltage of 15 V converted from an alternating current of 100 V power source was applied to the heating element 12. The supplied electric current was 53 A, and the heat release value was ≈800 W. The temperature in the equilibrium state of this apparatus became 200° C. or more, thus, the temperature zone to be applied for the heat bonding corresponds to the high-speed temperature rising region Ta illustrated in FIG. 2.

The temperature in the heating element changes as graph (A) in FIG. 11 which is a ramp-shaped change where the surface temperature rises linearly over the press bonding time. At the predetermined time, the applied electricity is turned off. The residual heat in the heating element dissipates through the heat dissipation material 14 and the temperature descends as graph (B) in FIG. 11. The welding face temperature response becomes a response to the linear ramp input as graph (C) in FIG. 11.

In the one side heating in the impulse sealer system, the model welding face temperature is assessed as (heating temperature−room temperature)/2+room temperature. In the response zone at around 1.0 s, the welding face temperature in the state of one side heating formula (1) is described above. In the one side heating, the heat flows in one-way direction from the heating element 12 to the anvil 16, and the surface temperature of the anvil 16 rises as graph (D) in FIG. 11.

An inflection point caused by melting can be seen at around 120° C. at 1.2 s in the measured data, thus, the heated face on the work is in paste-state after 1.2 s. The vicinity of 120° C. is the upper limit temperature of the heating. Namely, because the melting point of the sealant in the specimen is approximately 120° C., the specimen material should be heated up to 115-120° C. for liquidization. When the heating temperature exceeds the melting point, the heat conduction in the work changes, which results in the accelerated temperature rise, causing the formation of polymer beads, pinholes and edge tear.

The surface temperature of the anvil rises together upon the heating. After heating stops, the surface temperature of the anvil continues to rise by thermal inertia, and then, descends by natural heat dissipation.

In the impulse sealing with time limit heating, the start-up temperature at the next start varies by the heat accumulated in the heating element 12 and in the anvil 16 during the repeated operations. Due to the accumulated heat, the controlled temperature could vary up to 20° C., even when the heating is controlled with the exact same heating time (time of supplying electricity). Accordingly, there is a fundamental flaw in repeating the exact time limit control with short intervals when the cooling has not been fully completed. Thus, the exact time limit control is inadequate for the practical application for heat-sealing.

FIG. 12 shows an example of temperature drifting induced in the repeated operation in a conventional heat-sealing machine controlled by time-limit. From the measured results, temperature responses of 146° C. with a controlled heating time of 1.00 s, 154.3° C. with 1.04 s, 166.5° C. with 1.00 s, and 152.2° C. with 0.92 s were obtained. Although the time limit function is controlled within 0.1 s of variation, the response temperature values were not consistent and varied in a range of 10° C. From this example, defects of the conventional time-limit type impulse sealer system can be clearly understood.

The response example of FIG. 12 is in the case that the start-up temperature of the heating element in a conventional machine is maintained at room temperature. After the heating element is heated, when the applied electricity is turned off, a drifting response temperature of the heating element 12 is observed because it takes some time to cooling down to room temperature. Such a delay in cooling down becomes an obstacle for the repeated operate of the time-limit heat sealing system at a short time interval.

In the embodiment, a cover material 18 is disposed on the heating element 12 in the impulse sealer instead of the cover material 15 in FIG. 10. Specifically, a smooth Teflon sheet or smooth nylon sheet having a thickness of 0.03-0.2 mm is used as the cover material 18 instead of a conventional Teflon impregnated glass wool woven fabric. An interface temperature sensor (thermocouple) 9 of about 50 μm φ is attached on the surface of the cover material 18 on the side facing the work. A temperature sensor 17 of the anvil is installed. The welding face temperature detection sensor 10 is placed solely to assess of the welding face temperature response, and it is removed the actual working machine. A schematic construction for the embodiment is shown in FIG. 13.

A cascade temperature controller 20 receives the output signals of the interface temperature sensor 9 and the temperature sensor 17 of the anvil 16, and thereby, turns on or off a switch of a transformer 19, so as to control electricity to the heating element 12. The structure is shown in FIG. 14.

In the embodiment, when the cascade temperature controller 20 detects that a desired temperature is reached on the work, the electric source for heating is turned off, irrespective of time, to stop heating. Thus, the embodiment is a control method that is not affected by the initial temperature of heating element 12. The auxiliary operation to change heating time becomes unnecessary, and the frequent inspections for checking the bonding state becomes minimal.

Depending on a type of products the thickness and material of the work varies. The temperature rise characteristic also changes accordingly due to the different heat capacity of the work. This directly induces the time lag in the conventional time-limit heat sealing system.

Conventionally, the adequate pressing time was judged by the bonding state of the finished specimens based on a tensile test or visual observation, then, the pressing time was controlled by relying on the empirical rule. The heating temperature was set higher than the actual melting temperature to make sure that the sufficient heat is supplied to the work for achieving the melting state and strong bonding.

FIG. 15 shows measurement result of the embodiment using the apparatus shown in FIGS. 13 and 14. In the graph in FIG. 15, results of the controlled interface temperature and the response value of the welding face temperature are indicated. By directly detecting the temperature response of the cover material 18 and the contact face of the work 5, temperatures are detected at locations close to the welding face so as to eliminate the cause of variation. As a result of control in the embodiment, the range of the variation of the interface temperature becomes 124.9-121.5° C. (i.e., a variation of 3.4° C.) and the range of the variation of welding face temperature becomes 111.1-107.2° C. (i.e., a variation of 3.9° C.).

Because the impulse sealing is conducted by applying one-sided heating, an optimal temperature cannot be controlled directly. Like the example shown in FIG. 15, it is important that the results of control are mostly consistent every time.

According to the repeated operations of the method in the embodiment, overheating of the work is avoided, because the heating element 12 is maintained within a proper heating temperature range. Therefore, the heat accumulation in the anvil can be minimized.

The temperature variation in the anvil is about 3° C. in the repetitive operations, where each of the operation lasts about 10 s.

Method of Correcting Variation of the Anvil Temperature

The welding face temperature of the work is determined by the temperature difference between the heating element temperature T2 and the anvil temperature T1 (see formula (1)). If the anvil temperature T1 changes, the welding face temperature becomes variable, even when the heating element temperature T2 is controlled precisely. Practically, the predetermined value of temperature controller 20 is corrected with a cascade control through the output signal of the anvil temperature sensor 17 by increasing or decreasing about ½ of the variation portion of the anvil temperature T1 (see FIG. 14).

By this embodiment, the welding face temperature can be controlled and managed within a variation of 3° C. even when the seal bonding is carried out using the impulse sealing method.

Improvement in detection of the high speed temperature rise response.

The subject of the one of embodiments is a heat-sealing apparatus with a heating time zone of approximately 0.2 s or more.

In order to detect the temperature that changes at a high speed in a short period of time, an instrument capable of measuring such characteristics is needed.

For example, the temperature rise of the heating element of an impulse sealer is 25-150° C. in 1.0 s. Thus, the temperature rising rate is 125° C. per second. More specifically, the temperature rising changing rate is 12.5° C. in 0.1 s, and 1.25° C. in 0.01 s. Because digital temperature controllers are generally used, the temperature variation is detected within a sampling cycle. By changing the sampling cycle to 0.01 s, 0.02 s, and 0.05 s, temperature variation was estimated.

The results of operation are indicated in Table 1. In order to improve the accuracy of the temperature control, a controller having a sampling cycle of 0.01-0.02 s was chosen. It was found that sampling cycle of 0.01 s is preferred.

In an experiment in the actual control system, a thermal inertia in the welding face temperature was observed for 0.01 s after heating was stopped, and it was found that temperature deviation was about 2° C. This deviation was caused by the delay in the control system, such as a switch motion. Because the deviation is always constant, it can be corrected by including the deviation to the set value.

TABLE 1

Results of variation in operation of sampling cycle and detected temperature
(Application of example of 25-150° C./1 s)

| Sampling cycle (s) | Variation of detected temperature (° C.) |
| --- | --- |
| 0.01 | 1.25 |
| 0.02 | 2.50 |
| 0.05 | 6.25 |

Development of a Single-Linear Seal by the Impulse Sealing Method

Achieving a sealing and a easy-opening adhesion at the same time was an ultimate challenge in the heat sealing technique for a long time (presented in the establishment of ASTM F88 in 1968).

In the conventional impulse sealing method, it is difficult to control the temperature variation of the welding face temperature response within 4° C. for the easy-open adhesion, thus, the agglomerate bonding is often chosen as the best alternative.

By applying the embodiment, the single-linear sealing can be made even by impulse sealing.

The single linear seal device (Filigree Seal (JP 5779291) capable of easily openable heat sealing can be formed by installing a single linear projection in the vicinity of the center of the heating element.

The single linear seal has a composite heat seal structure wherein a linear seal is added to a band-shaped seal in the longitudinal direction. The linear seal is capable of sealing a bumpy folded portion of a gusset bag and the like.

FIG. 16 shows a construction of a single linear seal unit 30 wherein a single linear projection was added to the heating element 27.

Methods to add the single linear projection having a height of 0.1-0.6 mm to the heating element 27 is as follows.

A wire having the same material as the heating element 27 such as nichrome is selected.

FIG. 16 type (a) shows a half-cylinder shaped wire 21 is adhered with a thin nylon film 22 to fix on the heating element 27 in a position of about 70-80% of the width in the cross section. The single linear projection as the half-cylinder shaped wire 21 has a height of 0.3 mm, and formed by cutting the wire having a size of 0.9 mm into a half lengthwise to form a half-cylinder shape. The end portion of the half-cylinder shaped wire 21 is connected to the heating power supply in parallel with the heating element 27.

FIG. 16 type (b) shows a half cylinder shaped channel 24 having a depth of 0.5 mm is formed on the heating element 27 at around the middle in the longitudinal direction, and a wire 23 having a size of 0.8 mm is fitted in the channel 24. The wire is then adhered with a thin nylon film 22 and fixed. The end portion is connected to the heating power supply in parallel with the heating element.

FIG. 16 type (c) shows the entire body of the heating element is processed into a predetermined form as an integrated drawing material 25.

In order to uniformly heat the single linear projection portion and the rest of the plane portion, an insulating film 26 may be disposed between the heating element and the half-cylinder shaped wire 21 or the wire 23. Alternatively, the surface of the half cylinder shaped wire 21 or the wire 23, or the surface of heating element 27 may be coated with a thin insulating coating.

Subsequently, a cover material D 28, which is a Teflon smooth sheet having a thickness of 0.03-0.2 mm, is adhered on the plane portion.

A thermocouple 29 of about 50 μm φ that detects the interface temperature is attached on the approximate center of the surface of cover material.

An elastic body 16-2 having a hardness of A 50-80 and a thickness of 3-5 mm is disposed on the anvil 16 on the side facing the heating element 27 in order to press against the uneven surface of the thermocouple 29 and the like on the heating element.

EXAMPLES

Example 1

Performance Test for Application in the Heating Jaw System

The performance was examined by using the construction shown in FIG. 4 and below under conditions used in the practical operation.

(1) Size of the heating jaw; 40×40×200 mm (contact width with work 15 mm)
(2) Material of the heating jaw; brass
(3) Heater; 400 W, 10 mm φ
(4) Heating pipe 10 mm φ disposed near the surface of the heating body
(5) Temperature control of the heating body; 2-position PID control
(6) Cover material; 0.05 mm smooth Teflon sheet
(7) Interface temperature sensor; 50 μm, K thermocouple
(8) Interface temperature controller; high speed ON-OFF control
(9) Material of work; OPP 30/LLDPE 20
(10) Setting of the welding face temperature response (arrival temperature); 130° C.
(11) Pressing pressure; 0.2 MPa
(12) Inspection of the sealing condition; a flaw detecting fluid was applied.
(13) Temperature response measurement at each inspection point; "MTMS" kit (JP 3465741, JP 4623662) was applied.
(14) Inspection of the bonding state; tensile test, leak test with a flaw detecting fluid.

By referring to FIG. 17 which indicates an example, the following characteristics of the embodiment were found.

(1) Because a heating pipe was disposed in the heating body, the temperature unevenness in the longitudinal direction was maintained within 1° C., and the heating ability of heat sealing faces became uniform.
(2) The surface temperature of the cover material was 135° C. at idle time, while the heating body surface temperature was set at 140° C.
(3) The interface temperature descended to around 115° C. immediately after the pressing operation was started, and then rose continuously. The degree of the temperature descent varies according to the heat capacity (thickness) of the work.
(4) The welding face temperature began to rise immediately after pressing. When the pressing time was 0.27 s or more, the difference between the interface temperature and the welding face temperature response became 2° C. or less. Because the interface temperature value and the welding face temperature value are almost equivalent, the interface temperature can be used as the approximate temperature of the welding face.
(5) The CUT; 95% of welding face temperature in this heating was 0.81 s.
(6) At 0.44 s, the predetermined value of the interface temperature response welding face temperature response) of 130° C. was detected, and the jaw was lifted from the work. There was almost no thermal inertia, and the welding face temperature stopped rising at 130° C.
(7) It was confirmed that the welding face temperature can be controlled directly under a short heating time of 0.44 s.
(8) In order to control the welding face temperature at 115° C. under the same heating conditions, the interface temperature of 121° C. is set as the control point and the jaw is lifted from the work at an interval of ≈0.17 s, based on the simulation data of the interface temperature response and the welding face temperature response.

Example 2

Example of Application in the Impulse Sealing System

In the impulse sealing system, voltage is applied stepwise to the heating element at each cycle of the operation, and the temperature elevation of the heating element is utilized. Therefore, the change in the temperature by the heating is not step-shaped but ramp-shaped over time, when the relationship between the temperature and the heating time is expressed in a graph.

Impulse sealing is carried out by one-side heating where one side of the heating element is heated.

Upon applying the embodiment to impulse sealing, a method of simulating the temperature response at the bonding face of the work was devised by disposing a cover material 18 on the surface of the heating element, setting a minute sensor on the surface of the cover material 18, and the detecting heat flow to the work.

Tests were carried out under the following conditions with the system illustrated in FIG. 13 and FIG. 14.

Test Conditions (1) Heating element: width; 10 mm, thickness; 0.15 mm, heating capability; ≈800 W (100V AC)
(2) ON-OFF operation of heating element: relay contact (electricity supply OFF by detecting control point; motion delayed time ≈0.01 s)
(3) Temperature controller and its sampling cycle; digital thermometer of 0.01-0.05 s
(4) Control of alternating current power supply: variable transformer
(5) Temperature response measurement at each inspection point: "MTMS" kit (JP 3465741, JP 4623662) was used.
(6) Applied material: OPP (30/LLDPE (20)
(7) Inspection of the bonding state: tensile test, leak test with flaw detecting fluid
(8) Pressing pressure: about 0.1 MPa Test Method (1) A sealer to be tested is rendered under working conditions.
(2) Material (work) is kept under room temperature.
(3) The sealer is operated at an interval of 10-30 s to form a drift state of the temperature of the heating element and the pressure receiving plate (anvil).
(4) The temperature response of the heating element, the temperature response of the pressure receiving plate, the interface temperature response and the welding face temperature response of work are measured respectively by the "MTMS" kit.
(5) The boundary face temperature between the cover material and the work is detected by a minute sensor of a high speed type temperature controller. When reaching at a desired temperature, the driving power source of heating element is turned OFF by the output signal of the controller.
(6) The performance of the embodiment is evaluated by the measured results of temperature responses obtained at each location.

Results of the Test (1) Records of temperature responses at each location measured by the "MTMS" kit are shown in FIG. 18.
(2) Under varying initial temperatures of the anvil in the range of 40-60° C., the controlled temperature at a specific heating time were: 155.3° C. at 1.12 s, 155.2° C. at 0.92 s, 155.4° C. at 1.12 s, and 155.0° C. at 1.00 s.

(3) The heating times were 0.92-1.12 s, and it was confirmed that there is a variation in time to achieve the desired temperature control value. It was proven that there is a defect in time control.

(4) Based on the results, the welding face temperature can be controlled by the detection of the interface temperature. Specifically, by determining the interface temperature corresponding to the desired welding face temperature, and correcting the interface temperature by overrun value and the drift value of the anvil temperature.

Measured results including inspections of the welding face temperature response, the interface temperature and the surface temperature of the heating element are shown in FIG. 15.

Example 3

When repeated production operations were carried out in a short period of time with a cascade control which corrects variation of the anvil temperature, the heat flow arrives at the anvil to store heat, and the anvil temperature rises. Because the influence of the anvil on one-side heating can be defined by the aforementioned formula (1), variation of the anvil temperature can be corrected by continuous observation of anvil temperature.

(1) A minute sensor is always mounted on the surface of anvil.

(2) The standard value of the anvil temperature was set 30° C.

(3) Heating operation for 10-30 seconds is repeated.

(4) Indication of the anvil temperature immediately before the next operation is confirmed, and (Tx−30)/2 was corrected to the desired set value manually. (Manual operation of cascade control)

(5) By the corrected operation of (4), controlled results of the welding face temperature were obtained with variations within 2° C.

(6) By mounting a temperature sensor on the surface of the anvil continuously, a cascade control which automatically changes the set value of the controller by inputting the varying signals based on the temperature of the anvil can be provided. (see FIG. 14)

INDUSTRIAL APPLICABILITY

The embodiments provide adequate heat-sealing control conditions, and are widely applicable to various heat-sealing systems, such as the heating jaw system and the impulse sealing system.

The invention claimed is:

1. A method of heat-sealing using a heat-sealing apparatus which heat-seals a heat seal material by nipping it between a pair of heating bodies, which comprises:
mounting a cover material on a surface of at least one of the heating bodies on a side of the heat seal material;
attaching an interface temperature sensor on a surface of the cover material on a side of the heat seal material;
mounting a mounting film over the cover material and the interface temperature sensor;
monitoring a temperature of a welding face based on an interface temperature detected by the interface temperature sensor; and
controlling at least one of the pair of heating bodies based on the interface temperature,
wherein the cover material has a thickness of 0.03 mm to 0.2 mm and the mounting film has a thickness of 0.005 mm to 0.01 mm,
wherein at least one of the pair of heating bodies is heated at a predetermined temperature prior to a heat-sealing operation; and
wherein the pair of heating bodies heat seals the heat seal material by nipping said material.

2. A method of heat-sealing using an impulse apparatus which nips a heat seal material between a heating element and an anvil to heat-seal it, which comprises:
mounting a cover material on a surface of the heating element of said impulse apparatus on a side of the heat seal material;
attaching an interface temperature sensor on a surface of the cover material on a side of the heat seal material;
mounting a mounting film over the cover material and the interface temperature sensor,
monitoring a temperature of a welding face based on an interface temperature detected by the interface temperature sensor; and
controlling the heat element based on the interface temperature,
wherein the cover material has a thickness of 0.03 mm to 0.2 mm and the mounting film has a thickness of 0.005 mm to 0.01 mm, and
wherein the heat seal material is heat sealed by nipping it between the anvil and the heating element.

3. The method of heat-sealing as set forth in claim 2, further comprising:
attaching an anvil temperature sensor on a surface of the anvil;
detecting an anvil temperature of the anvil; and
controlling a heating temperature of the heating element by a cascade temperature controller based on the anvil temperature of the anvil and the interface temperature.

4. The method according to claim 1, wherein the cover material is a polytetrafluoroethylene sheet or a polyamide sheet.

5. The method according to claim 1, wherein the mounting film is a polyamide film.

6. The method according to claim 1, wherein the interface temperature sensor is a thermocouple.

* * * * *